(12) United States Patent
Plakolm (10) Patent No.: US 8,997,969 B2
(45) Date of Patent: Apr. 7, 2015

(54) PRODUCTION CELL WITH A WORKPIECE TRANSFER DEVICE, AND TRANSPORT DEVICE FOR WORKPIECES AND PART CARRIERS

(75) Inventor: Juergen Plakolm, Herzogsdorf (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 155 days.

(21) Appl. No.: 13/825,371

(22) PCT Filed: Sep. 20, 2011

(86) PCT No.: PCT/AT2011/050011
§ 371 (c)(1),
(2), (4) Date: May 2, 2013

(87) PCT Pub. No.: WO2012/037592
PCT Pub. Date: Mar. 29, 2012

(65) Prior Publication Data
US 2013/0213769 A1    Aug. 22, 2013

(30) Foreign Application Priority Data
Sep. 21, 2010    (AT) .................. A 1570/2010

(51) Int. Cl.
 B65G 49/02      (2006.01)
 B65G 37/00      (2006.01)
 B23Q 7/00       (2006.01)
 B23Q 7/04       (2006.01)
 B23Q 7/05       (2006.01)
 B23Q 7/14       (2006.01)

(52) U.S. Cl.
 CPC .............. *B65G 37/005* (2013.01); *B23Q 7/005* (2013.01); *B23Q 7/04* (2013.01); *B23Q 7/05* (2013.01); *B23Q 7/1426* (2013.01); *B23Q 7/1442* (2013.01)

(58) Field of Classification Search
 USPC ............. 198/580, 465.1, 465.2, 346.1, 346.2; 29/428, 281.1; 414/222.07
 See application file for complete search history.

(56) References Cited

U.S. PATENT DOCUMENTS 4,494,298 A     1/1985   Matsuura et al.
5,465,827 A *  11/1995   Nakagawa et al. ........ 198/465.3

(Continued)

FOREIGN PATENT DOCUMENTS

DE     32 19 394      12/1982
DE     296 22 433      3/1997

(Continued)

OTHER PUBLICATIONS

International Search Report of PCT/AT2011/050011, Mar. 7, 2012.

(Continued)

*Primary Examiner* — James R Bidwell
(74) *Attorney, Agent, or Firm* — Collard & Roe, P.C.

(57) ABSTRACT

A production cell for automated processing of workpieces has a protective fence and, arranged therein, at least one production device, for example a bending press, and at least one handling device. A workpiece transfer device for part carriers or workpieces is arranged in the production cell which workpiece transfer device forms a supply position and a delivery position. Here, a delivery device of the workpiece transfer device forms a first delivery path and a second delivery path which extends parallel to the former, wherein, furthermore, a conveyor for optional transfer of a part carrier between the delivery paths is provided on an actuating device.

18 Claims, 4 Drawing Sheets

(56) References Cited

U.S. PATENT DOCUMENTS

| | | | |
|---|---|---|---|
| 5,577,597 A * | 11/1996 | Kakida et al. | 198/465.1 |
| 6,098,269 A * | 8/2000 | Albus et al. | 29/564 |
| 6,516,935 B1 * | 2/2003 | McLennan | 198/347.3 |
| 8,220,613 B2 * | 7/2012 | Dehne et al. | 198/346.2 |
| 8,307,972 B2 | 11/2012 | Horn et al. | |
| 2004/0238323 A1 * | 12/2004 | Abbestam et al. | 198/346.2 |
| 2005/0063799 A1 * | 3/2005 | Larson et al. | 414/217 |
| 2007/0289844 A1 * | 12/2007 | Fukazawa et al. | 198/465.1 |
| 2009/0249606 A1 | 10/2009 | Diez et al. | |
| 2010/0320668 A1 | 12/2010 | Takahashi et al. | |
| 2012/0083920 A1 * | 4/2012 | Suyama et al. | 198/346.2 |

FOREIGN PATENT DOCUMENTS

| | | |
|---|---|---|
| DE | 10 2006 029 643 | 1/2008 |
| DE | 10 2008 009090 | 6/2009 |
| EP | 2 116 325 | 11/2009 |
| JP | 59-082230 | 5/1984 |
| JP | 32 56924 | 11/1991 |

OTHER PUBLICATIONS

International Preliminary Report on Patentability of PCT/AT2011/050011, Mar. 21, 2013.

* cited by examiner

Fig. 1

Fig.2

PRODUCTION CELL WITH A WORKPIECE TRANSFER DEVICE, AND TRANSPORT DEVICE FOR WORKPIECES AND PART CARRIERS

CROSS REFERENCE TO RELATED APPLICATIONS

This application is the National Stage of PCT/AT2011/050011 filed on Sep. 20, 2011 which claims priority under 35 U.S.C. §119 of Austrian Application No. A 1570/2010 filed on Sep. 21, 2010, the disclosure of which is incorporated by reference. The international application under PCT article 21(2) was not published in English.

BACKGROUND OF THE INVENTION

1. Field of the Invention

The invention relates to a production cell and a transport device.

2. Description of the Related Art

For the serial production of workpieces in production devices, in which the demands on expensive production devices are in many cases very high in relation to the handling efficiency or cycle times for cost reduction, often the transfer of parts for operating the production machines by workpiece handling devices is automated, in particular by using robots. However, this requires the appropriate provision of parts in the area around the robot and also the removal of the latter, whereby in many cases the workpieces are stored on parts carriers which are transported manually by transport means, e.g. fork lift trucks, stackers etc. To ensure the safety of staff during such transport processes at least the handling devices need to be switched off and this also requires in many cases the stoppage of the production machine, where stoppage times increase the production costs.

SUMMARY OF THE INVENTION

Said objective is achieved by the features according to one aspect of the invention. The advantage of this is that operation-determined disruptions of the production process running in the production cell are reduced by the automated supply and removal of workpieces to and from the production cell and a high degree of safety is achieved for the operating staff.

Said objective of the invention is achieved by the features defined in the characterizing part of claim 1. The advantage of this is that operation-determined disruptions of the production process running in the production cell are reduced by the automated supply and removal of workpieces to and from the production cell and a high degree of safety is achieved for the operating staff.

A configuration in accordance with an embodiment is also possible, as in this way the space required for the workpiece transfer device in the production cell is small and also the transfer paths for the workpiece transfer are kept short by the workpiece handling device and in this way additional processing times are reduced.

According to the advantageous developments of other embodiments it is ensured that the entire workpiece transfer device is installed on an operating surface without additional structural measures.

According to other advantageous embodiments an inexpensive conveying device suitable for conveying both pallets and containers is achieved as well as short transfer paths for the handling device and also workpieces can be placed directly onto conveyor belts and can be transported thereby to avoid surface damage which may occur during the transport of loose material.

The configurations according to other embodiments are also advantageous, by means of which a very universal and suitably adapted design of a workpiece transfer device is achieved and in which a high degree of handling efficiency is achieved taking into consideration the properties of the workpiece and the requirements.

By means of the advantageous developments of other embodiments an optionally reversible handling of the workpiece carrier adjusted as necessary through the conveying direction is achieved.

Using further advantageous embodiments unintentional or impermissible manipulation is prevented as far as possible.

An advantageous embodiment ensures additional storage spaces by means of which the duration of the automated sequence between necessary breaks in operation is extended and thereby productivity is increased.

According to the advantageous development of another embodiment the universal use of parts carriers is possible in different configurations, such as pallets, containers and/or trays, with or without an attachment frame.

The advantageous configurations of other embodiments ensure a smooth operation and a permanent monitoring of the correct functioning of the workpiece transfer device and rapid intervention and the quick implementation of measures in case of any disruption.

Lastly, a configuration of another embodiment is also advantageous, in which the cycle time is reduced during the workpiece transfer through the workpiece handling device.

However, it is also an objective of the invention to create a transport device for an automated production process of workpieces in a production device, by means of which manual intervention in a production cell endangering the safety of an operator is avoided as far as possible.

Said objective is achieved by the measures in accordance with another aspect of the invention. The advantage here is that the continuous handling of parts carriers supplying and removing the workpieces for processing to and from a production cell and in this way interruptions to the automatic operation are kept to a minimum.

Advantageous developments are also described in other embodiments, whereby for automated workpiece processing in a production installation a high workpiece throughput capacity of a production cell is achieved and a workpiece transfer device adjustable to required specifications is obtained.

Lastly, the configurations of other embodiments are also advantageous, as in this way a very universal and adaptable design of a transport device is achieved and a high degree of handling efficiency is achieved taking into consideration the workpiece properties and requirements.

BRIEF DESCRIPTION OF THE DRAWINGS

For a better understanding of the invention the latter is explained in more detail with reference to the following Figures.

In a much simplified representation.

DETAILED DESCRIPTION OF THE PREFERRED EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Figure 1:
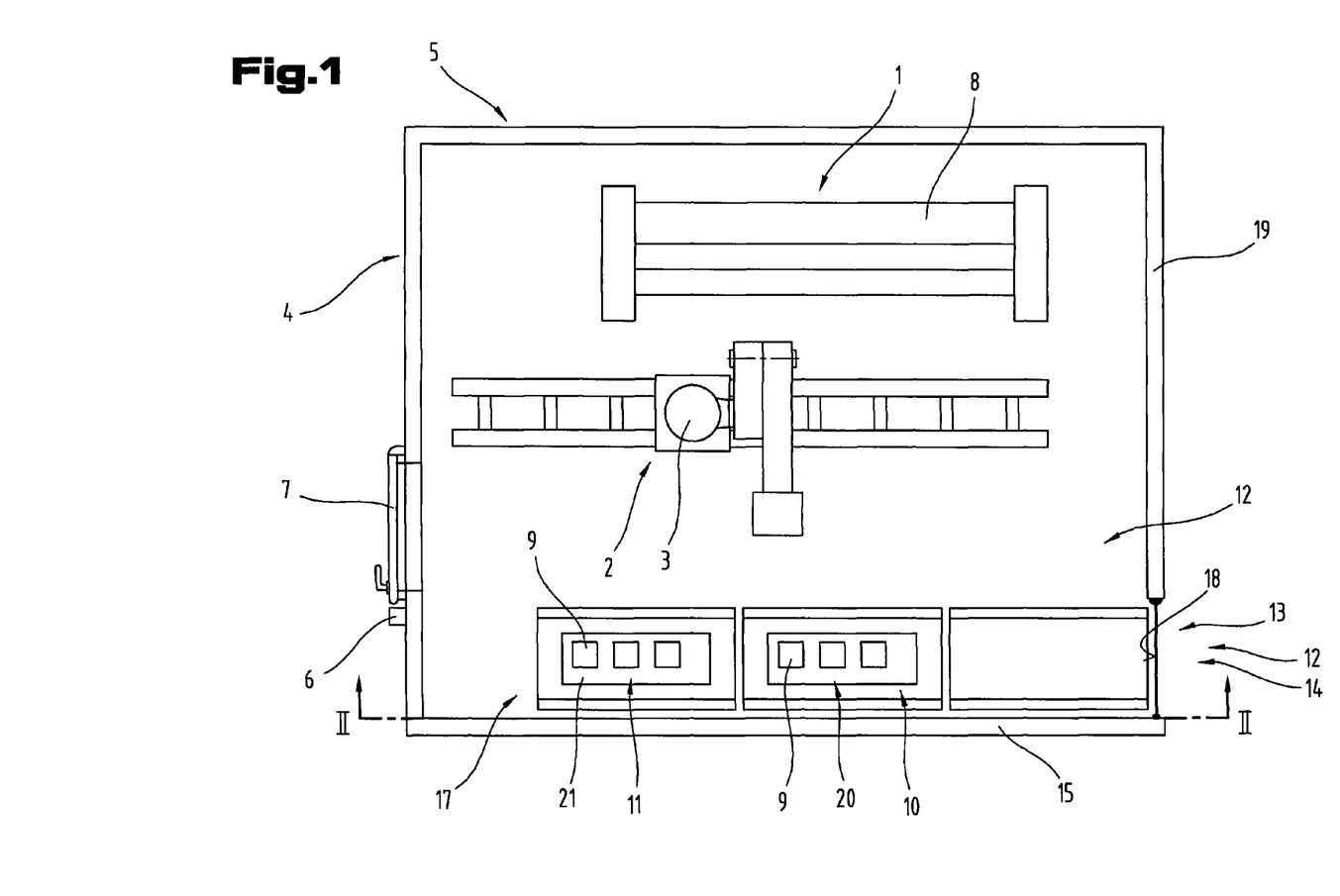
FIG. 1 shows a production cell according to the invention with a production device operated by a workpiece handling device and with a workpiece transfer device, in a simplified representation.

FIG. 1 shows a production device 1 and a handling device 2, for example a multi-axis robot 3, inside a production cell 5 surrounded by a protective fence 4. The production cell 5 is only accessible to an authorized operator via a door 7 provided in the protective fence 4 and provided with a safety device 6 to prevent unauthorized access.

The production device 1 is for example a bending press 8 for the production of bent workpieces 9, which are picked up by the handling device 2, e.g. the multi-axis robot 3, in a readiness position 10 and supplied to the bending press 8 for performing a bending process and after the shaping process are deposited at a depositing position 11.

For the delivery and removal of the workpieces 9 to or from the production cell 5 a workpiece transfer device 12 is provided which ensures automated workpiece handling from an operating space surrounding the production cell 5 or an operating surface into or out of the production cell 5.

The workpiece transfer device 12 according to the invention is formed according to the shown exemplary embodiment by a conveying device 16 which forms conveying paths 13, 14 in two conveying levels above one another and extends along a side wall 15 of the protective fence 4 with an adjusting device 17 comprising a conveying device arranged adjacent thereto and adjustable in vertical direction, as described in more detail below.

This two-level configuration of the conveying device 16 ensures that there is a small space requirement in the production cell 5 and that there is overall a high handling efficiency of workpieces 9 and thereby a high productivity with low additional times for the parts handing because of short transfer paths.

The workpiece transfer device 12 according to the invention can be operated via an input and output lock 18, which is arranged in a transverse side wall 19 of the protective fence 4, for the transfer of workpieces, as already described above. The workpiece transfer is performed according to this example by means of parts carrier 20, e.g. pallets with or without attachment frame, containers, trays, workpiece-, sorting- or positioning boxes etc. which are supplied either in a filled or empty state to the readiness position 10 and removed in a filled or empty state from the discharge position.

Figure 2:
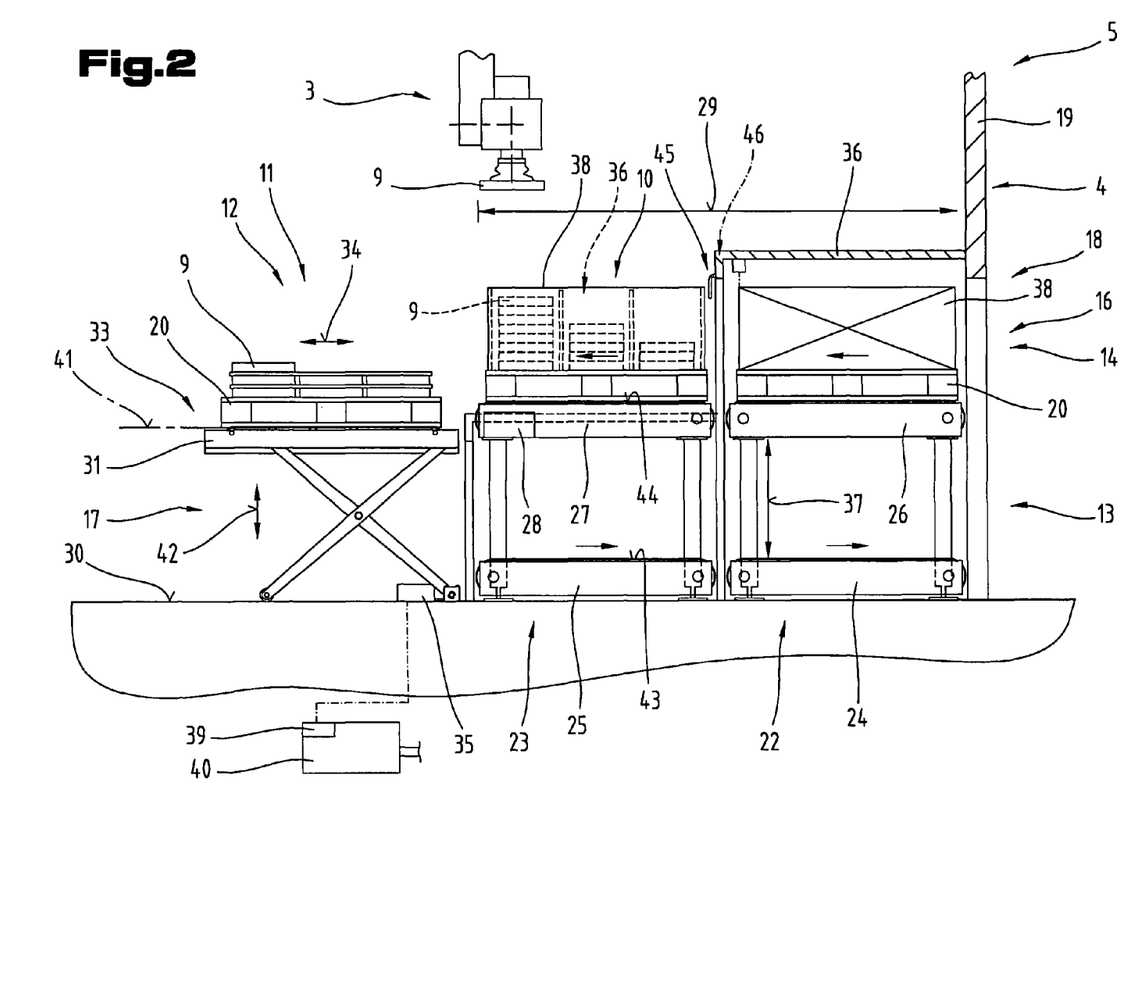
FIG. 2 shows a configuration of the workpiece transfer device according to the invention in elevation according to lines II-II in FIG. 1, in a simplified representation.

FIG. 2 shows a possible configuration of the workpiece transfer device 12 with the two-level conveying device 16 forming the first and the second conveying path 13, 14 and the adjusting device 17 arranged adjacent thereto and with reference to this Figure also a possible supply and removal of the workpieces 9 to and from the production cell 5 is described with the workpiece transfer device 12 and parts carriers 20. In this exemplary embodiment for example the workpieces 9 are supplied via the conveying path 14 to the readiness position 10 and removed via the conveying path 13 from the discharge position 11.

The conveying device 16 is preferably designed for the phased transport of a parts carrier 20, for example a pallet 21, both for the first conveying path 13 and the second conveying path 14 by two immediately adjacent conveying means 24, 25, 26, 27 each forming respectively a first and a second conveying station 22, 23, which each have their own drive means 28, e.g. electric motor.

Each conveying path 13, 14 is configured for a total conveying distance 29 extending from the input and output lock 18 of the protective fence 4 into the production cell 5, for example twice the length of a EURO pallet of 1,200 mm, i.e. for a total of about 2,400 mm.

Following the conveying means 24, 25 forming the first conveying path 13, which are fixed directly on a standing surface 30, is the adjusting device 17 also configured for the format of a EURO pallet, for example a lifting table 31, e.g. lift 32, scissor lifting table etc. for the vertical transport of the parts carrier 20 between the conveying paths 13, 14 overlaying one another with a vertical spacing.

On the lifting table 31 or lift 32 a conveyor 33 is arranged by means of which the parts carrier 20 is taken from the adjoining conveying means 25, 27 or given over to the latter.

In principle, it is possible to provide the conveying means 24, 25 for the first conveying path 13 and the conveying means 26, 27 for the second conveying path 14 as shown by means of the arrows in FIG. 2, for only one conveying direction, e.g. the upper conveying path 14 for the transport of the parts carrier 20 or workpieces 9 into the production cell 5 and the lower conveying path 14 for the removal of the parts carrier 20 or workpieces 9 from the production cell 5.

It is advantageous however to increase the conveying variants and thereby the flexibility of the workpiece transfer device 12 to configure the drive means 28 or the control of the drive means 28 for reversible conveying directions, as is necessary in principle for the conveyor 33 arranged on the lifting table 31—according to double arrow 34—for taking and returning over the parts carrier 20 from or to the adjoining conveyor 25, 27.

By dividing the conveying means 24 to 27 into the conveying stations 22, 23 the provision capacity of the workpiece transfer device 12 for the delivery and removal of the parts carrier 20 into or out of the production cell 5 and thereby the handing of the parts is also increased.

For the conveying means 24 to 27 and the conveyor 33 it is possible to use conveyor belts, belt conveyors, multi-track conveyors, roller conveyors, which are all suitable for conveying all common goods or parts carriers such as pallets, containers, trays etc. and are well known for reliable long-term operation from conveyor technology.

According to preferred embodiment the conveying means 24 to 27 are formed by the conveyor belts and the conveyor 33 of the adjusting device 17 by a roller conveyor.

As also shown in FIG. 2 in the area of the first conveying station 22 adjoining the input and output lock 18 a tunnel-like partition is formed by separating and cover elements 36, by means of which the unpermitted entry of an unauthorized person into the production cell 5 is prevented or at least made more difficult. Of course, it is also possible to secure further areas of the workpiece transfer device 12, insofar as the latter do not prevent the handling of the parts by the handling device 2, by means of such separating and cover elements 36—as shown by broken lines.

In the arrangement of the conveying means 24 to 27 running on top of one another and any separating and cover elements 36, and the input and output lock 18 a free conveying height 37 is provided which is preferably between 800 and 1,000 mm, for example for conveying parts carriers 20 provided with an attachment frame 38.

The adjusting device 17 formed for example by the lifting table 31 is connected preferably to a lift control 39 of a superordinate control device 40 controlling the whole workpiece transfer device 12, which makes it possible to control a conveying plane 41 formed by the conveying means 33 of the lifting table 31 in vertical direction—according to double arrow 42—in predefinable height levels between a conveying plane 43 of the lower conveying path 13 and a conveying plane 44 of the upper conveying path 14.

In this way it is possible for example—as shown in FIG. 2—from the upper conveying plane 41 onto a parts carrier 20 prepared on the conveyor 33 to place individually finished workpieces 9 with a robot 3 in layers on the parts carrier 20, e.g. for sensitive workpieces, which are not to be treated like bulk materials.

As soon as one layer has been completed, for example by means of the robot 3, a cardboard separating layer is placed onto the workpieces 9 onto which a further layer of workpieces 9 is placed.

After each layer the level of the adjusting device 17 with the conveyor 33 is lowered by the height of a layer, whereby the depositing of the workpieces 9 is performed independently of the parts layer, by the layered lowering of the lifting table 31 to the same height level. In this way a uniform cycle time is achieved for the transfer process as well as a uniform controlling sequence for the handling device 2.

As shown in FIG. 2 the workpieces 9 provided for processing and picking up by the robot 3 on the upper conveying path 14 in the conveying station 23 are stacked prepositioned on or in a parts carrier 20 in so-called positioning shafts.

The transportation of the parts carrier 20 filled with layers of processed workpieces 9 is performed after reaching the conveying plane 43 via the lower conveying path 13 into the conveying station 22 from where they can be transported through the input and output lock 18 of the filled parts carrier 20, e.g. by means of a stacker or transport platform, from the production cell 5 without interrupting the further operation of the production device or the robot 3.

According to a preferred embodiment of the workpiece transfer device 12, for example in the area of the input and output lock 18 and/or between the conveying stations 22, 23 and/or between the conveying station 23 and the adjusting device 17, control and detecting means 45, e.g. light barriers 46, or proximity sensors 47 are provided. The latter are communication-connected to the control device 40 and by means of control information from the lift control 39 of the adjusting device 17 a position monitoring and controlling is achieved for the optimized and reliable operation of the workpiece transfer device 12.

Figure 3:
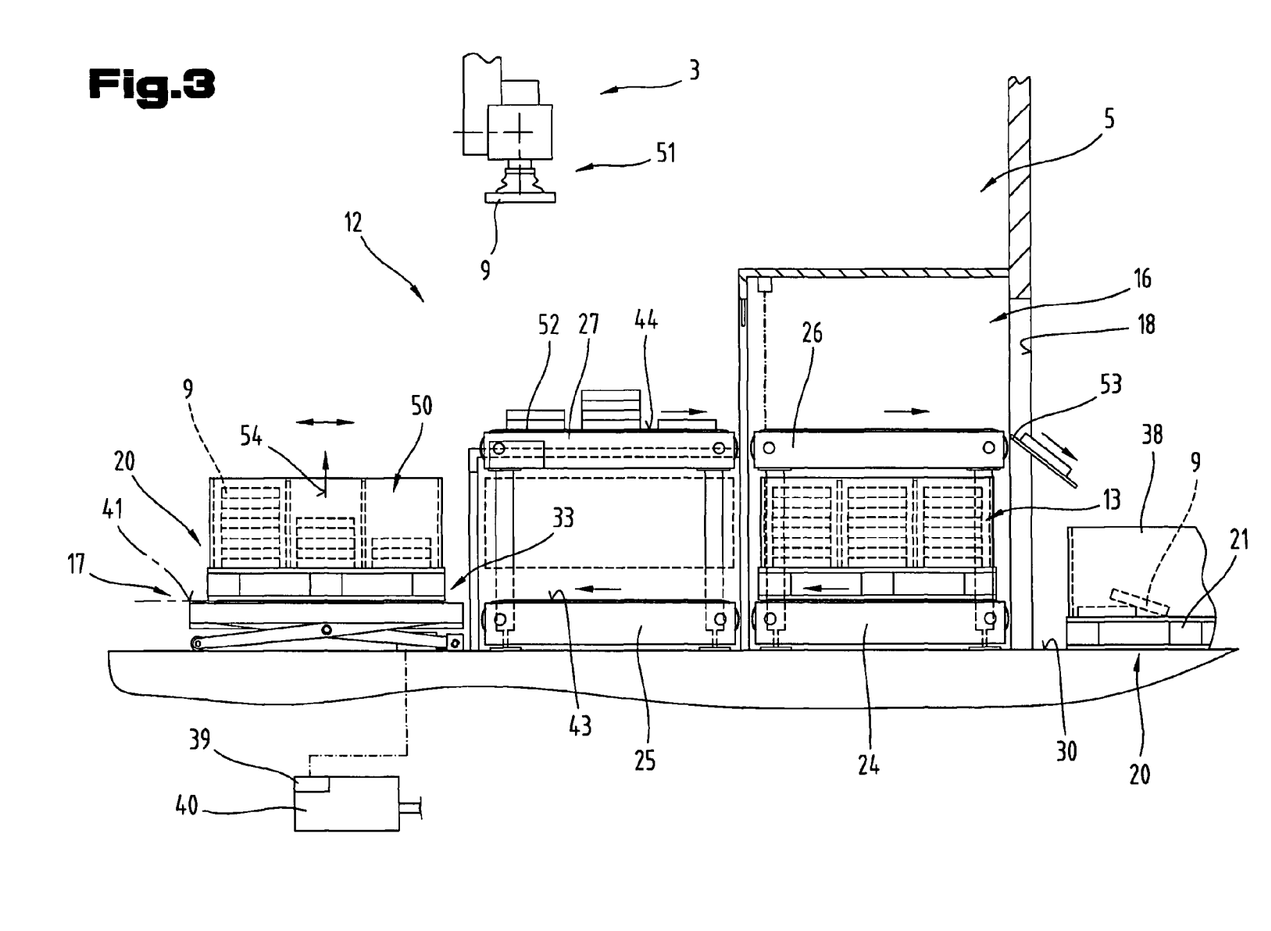
FIG. 3 shows a further configuration of the workpiece transfer device in elevation, in a simplified representation.

FIG. 3 shows the production cell 5 with the workpiece transfer device 12 arranged therein and already described above and in the following a further possible variant of the supply and removal of the workpieces 9 to or from the production cell 5 is described.

According to this exemplary embodiment the conveying direction of the conveying means 24, 25, 26, 27 of the conveying device 16 is provided in opposite direction from the exemplary embodiment described above, as can be seen with reference to the arrows.

The workpieces 9 provided for processing are prepositioned in so-called removal shafts 50 of a parts carrier 20, for removal by a gripping device 51 of the robot 3.

The workpiece carrier 20 with the workpieces 9 to be processed is conveyed on the lower conveying path 13 in the direction of the lifting table 31 and is taken from the latter by means of the conveyor 33 arranged on the lifting table 31 and thereby provided in a readiness position.

In addition, the lifting table 31 is aligned in its lower end position, in which the conveying plane 41 of the conveyor 33 is flush with the conveying plane 43 of the lower conveying path 13 and thus the workpiece carrier 20 is ready in this position on the adjusting device 17 for the removal of the workpieces 9.

After performing the processing procedure on the production device, which is not shown in more detail, the robot 3 transfers the finally processed workpiece 9 to the conveying device 16, and according to the exemplary embodiment shown the workpiece 9 is placed directly on the conveying means 27, for example on a conveyor belt 52 for transportation from the production cell 5 by the conveying means 26 and 27.

As also shown for example a pallet 21 comprising the attachment frame 38 as parts carrier 20 is deposited outside the production cell 12 directly in the area of the input and output lock 18 on the standing surface 30.

The processed workpieces 9 removed by the conveying means 26 are diverted via a slide 53 to the parts carrier 20 or into the attachment frame 38 and collected in the latter.

Furthermore, it should also be noted that by means of a phased adjustment of the height of the conveying plane 41 of the conveyor 33 by means of the adjusting device 17, a layered removal of the workpieces 9 at a constant height for gripping device 51 is achieved. This is performed by controlling the adjusting device 17 with the lift control 39 of the control device 40, to which the parts carrier 20 is adjusted after the removal of a layer of workpieces 9 by a height in a direction vertical to the standing surface 30—according to arrow 54.

In this way the advantage is achieved of a uniform positioning for the gripping device 51—with respect to the gripping height and the depositing height for picking up and depositing the workpiece and thereby a simplification of the control and there is the additional advantage of having uniform transfer paths.

The direct depositing of the processed workpiece 9 onto the conveyor belt is also particularly advantageous for surface-sensitive workpieces 9, as e.g. scratch marks are avoided on the workpiece 9 which could be made when carrying loose material.

It should also be noted that instead of the shown slide 53 and the parts carrier 20 the workpieces 9 transported by the conveying means 26 can be transferred to a not shown conveying device for further transport to a more remote collecting device.

Figure 4:
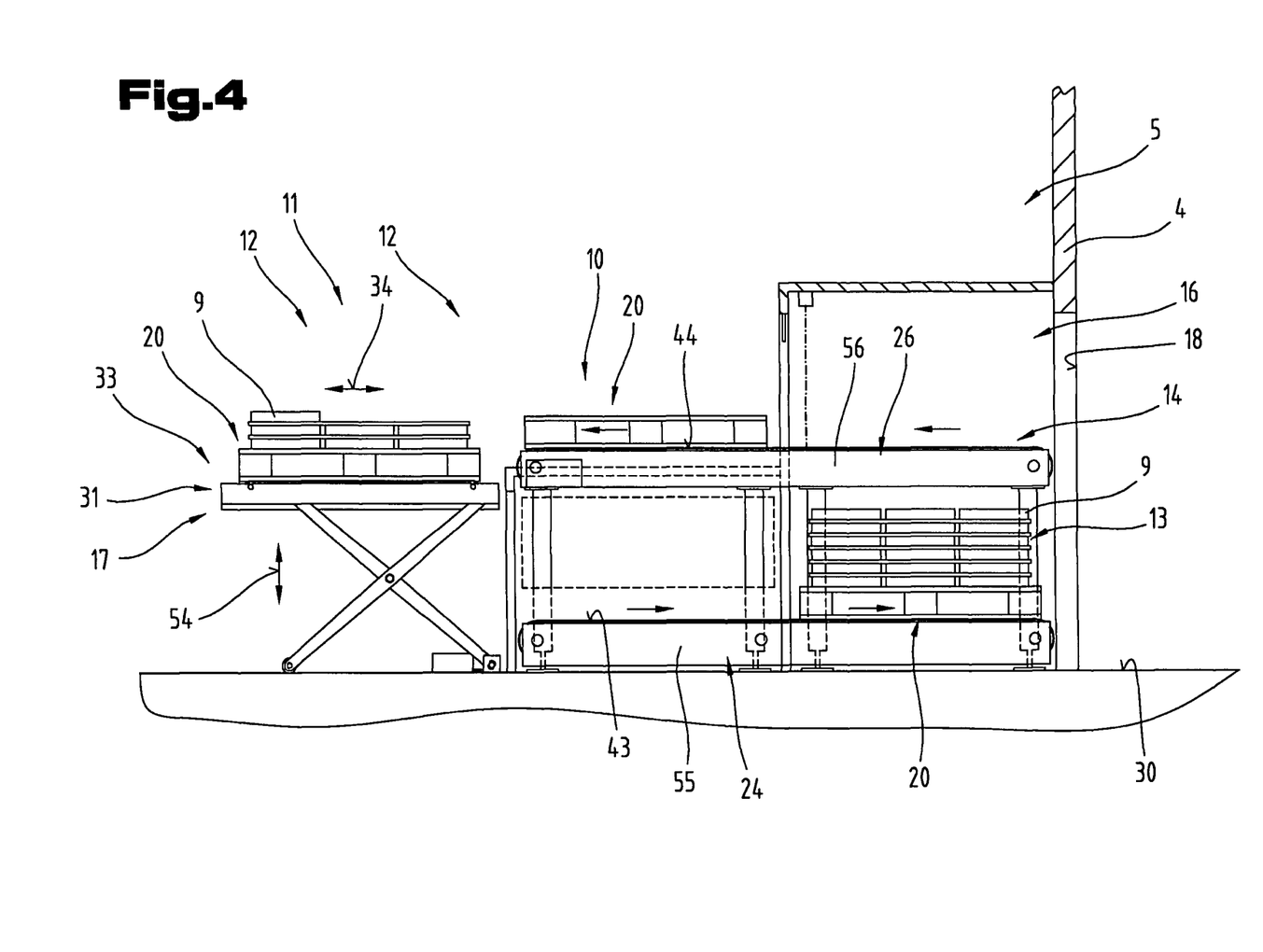
FIG. 4 shows another embodiment of the workpiece transfer device in elevation, in a simplified representation.

FIG. 4 shows a further embodiment of the workpiece transfer device 12 with the two-level conveying device 16 operated via the input and output lock 18 of the protective fence 4 and the immediately adjoining adjusting device 17 adjustable in a direction perpendicular to the standing surface 30—according to double arrow 54—which is formed by the lifting table 31 with the conveyor 33 arranged thereon.

According to this configuration the supply of workpieces 9 provided for processing into the bending cell 5 is performed by not shown transport means, e.g. a pallet conveyor, container conveyor or manually by means of fork-lift trucks to a preparation place from which the workpieces 9 are picked up by the handling device.

By means of the workpiece transfer device 12 empty parts carriers 20 are conveyed via the conveying path 14 to the readiness position 10 and are taken for filling onto the conveyor 33 of the lifting table 31 as the deposit position 11 from which the filled parts carrier 20 is transported via the conveying path 13 from the production cell 5.

The conveying device 16 according to this exemplary embodiment is formed by a pallet conveyor 55 secured directly onto the standing surface 30 for the removal of the parts carrier 20 filled with processed workpieces 9, in the shown exemplary embodiment a pallet with workpieces 9 stacked in layers.

Of course, other types of embodiments of the parts carrier 20 are possible, for example pallets with an attachment frame, containers, trays etc.

The pallet conveyor 55 is preferably configured as a multi-track band or roller conveyor, which makes it possible for a parts carrier 20, which in the filled state in the production cell 5 is provided directly in front of the input and output lock 18, to be picked up and transported away by means of an approaching, not shown fork-lift truck. The pallet conveyor 55 forms the conveying plane 43 of the first conveying path 13 relative to the standing surface 30 only a small distance above the latter.

Above the pallet conveyor 55 and at a corresponding passage height there is a conveyor means 26, preferably a conveyor belt 56 forming the second conveying path 14 with the conveying plane 44 for transporting and providing empty parts carriers 20, for example pallets, in the bending cell 5 and for taking by the conveyor 33 of the adjusting device 17, in particular the lifting table 31.

The transfer onto the lifting table 31 is performed on the one hand via the drive and operation of the conveyor belt 56 with the simultaneous operation of the conveyor 33, which is formed preferably by a roller conveyor with a reversible drive for a variable conveying direction—according to double arrow 34.

It should also be noted that of course the pallet conveyor 55 and the conveyor belt 56 forming the second conveying plane 14 with drives operably reversibly by the conveying direction can be used for a possible reversible throughput direction of the parts carrier 20, both in the empty and filled state, whereby the workpiece transfer device 12 can be used very universally.

In the shown exemplary embodiment the length of the conveying device 16 is defined i.e. to be twice the length of the parts carrier 20, whereby additional storage space is provided for empty and filled parts carrier 20. At a low throughput volume for example only one storage space and thereby a shorter length of the conveying device may be sufficient.

The exemplary embodiments show possible embodiment variants of the production cell and the parts transfer device, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the production cell 5 and the parts transfer device the latter and its components have not been represented true to scale in part and/or have been enlarged and/or reduced in size.

The problem addressed by the independent solutions according to the invention can be taken from the description.

| List of Reference Numerals |
|---|
| 1 production device |
| 2 handling device |
| 3 multi-axis robot |
| 4 protective fence |
| 5 production cell |
| 6 safety device |
| 7 door |
| 8 bending press |
| 9 workpiece |
| 10 readiness position |
| 11 discharge position |
| 12 workpiece transfer device |
| 13 conveying path |
| 14 conveying path |
| 15 side wall |
| 16 conveying device |
| 17 adjusting device |
| 18 input and output lock |
| 19 transverse side wall |
| 20 parts carrier |
| 21 pallet |
| 22 conveying station |
| 23 conveying station |
| 24 conveying means |
| 25 conveying means |
| 26 conveying means |
| 27 conveying means |
| 28 drive means |
| 29 conveying distance |
| 30 standing surface |
| 31 lifting table |
| 32 lift |
| 33 conveyor |
| 34 double arrow |
| 35 drive means |
| 36 separating and cover element |
| 37 conveying height |
| 38 attachment frame |
| 39 lift control |
| 40 control device |
| 41 conveying plane |
| 42 double arrow |
| 43 conveying plane |
| 44 conveying plane |
| 45 control and detecting means |
| 46 light barrier |
| 47 proximity sensor |
| 48 |
| 49 |
| 50 removal shaft |
| 51 gripping device |
| 52 conveyor belt |
| 53 slide |
| 54 arrow |
| 55 range conveyor |
| 56 conveyor belt |

The invention claimed is:

1. A production cell (5) for the automated processing of workplaces (9) with a protective fence (4) and arranged therein at least one production device (1), and at least one handling device (2) and one readiness position (10) and a discharge position (11) for the workpieces (9) or parts carrier (20), and a workpiece transfer device (12) forming the readiness position (10) and the discharge position (11) for the workpieces (9) or parts carrier (20), the workpiece transfer device (12) having a conveyor device (16) which forms a first conveying path (13) and a second conveying path (14) running parallel thereto, wherein the first conveying path (13) and the second conveying path (14) run above one another and form conveying planes (43, 44) running parallel to a standing surface and overlapping one another at least partly and the workpiece transfer device (12) has a conveyor (33) arranged on an adjusting device (17) in the form of a lifting table (31) or lift (32) for the optional transfer of a parts carrier (20) between the conveying paths (13, 14), wherein the adjusting device (17) with the conveying plane (41) formed by the conveyor (33) can be adjusted by a lift control (39) of a superordinate control device (40) controlling the entire workpiece transfer device (12) without graduation between the first and the second conveying plane (43, 44) of the conveying paths (13, 14) at predefinable height levels.

2. The production cell as claimed in claim 1, wherein the conveyor (33) is formed by a roller conveyor.

3. The production cell as claimed in claim 1, wherein the first and second conveying paths (13, 14) of the conveying device (16) are formed respectively by a conveying means (24, 26).

4. The production cell as claimed in claim 3, wherein the first conveying means (24) is formed by a pallet conveyor (55).

5. The production cell as claimed in claim 3, wherein the second conveying means (26) is formed by a belt conveyor (56).

6. The production cell as claimed in claim 1, wherein the first and the second conveying paths (13, 14) of the conveying device (16) are formed respectively by two conveying means (24, 25, 26, 27) adjoining one another directly in a conveying direction.

7. The production cell as claimed in claim 6, wherein the conveying means (24, 25, 26, 27) are formed by belt conveyors.

8. The production cell as claimed in claim 6, wherein the conveying means (24, 25, 26, 27) of the first and second conveying paths (13, 14) respectively form two adjoining conveying stations (22, 23).

9. The production cell as claimed in claim 8, wherein the conveying means (24, 25, 26, 27) are formed by accumulation rollers or accumulation conveyors.

10. The production cell as claimed in claim 8, wherein the conveying means (24, 25, 26, 27) are provided respectively with a drive means (28).

11. The production cell as claimed in claim 10, wherein the drive means (28) is formed by an electric motor.

12. The production cell as claimed in claim 1, wherein at least partly, the workpiece transfer device (12) is delimited tunnel-like by separating and cover elements (36).

13. The production cell as claimed in claim 12, wherein the separating and cover elements (36) are at least partly transparent.

14. The production cell as claimed in claim 6, wherein a conveying distance (29) of the conveying means (24, 25, 26, 27) arranged per conveying path (13, 14) corresponds at least to a double length of the parts carrier (20).

15. The production cell as claimed in claim 1, wherein a free conveying height (37) of the conveying paths (13, 14) is at least greater than the total height of a parts carrier (20) provided with an attachment frame (38).

16. The production cell as claimed in claim 1, wherein control and detecting means (45) are arranged for monitoring and controlling the workpiece transfer device (12) along the conveying paths (13, 14).

17. The production cell as claimed in claim 16, wherein the control and detecting means (45) are formed by light barrier arrangements (46) communication-connected to a control device (40).

18. The production cell as claimed in claim 16, wherein the control and detecting means (45) are formed by proximity sensors (47) communication-connected to the control device (40).

* * * * *